(12) United States Patent
Williams et al.

(10) Patent No.: US 9,660,855 B2
(45) Date of Patent: May 23, 2017

(54) ORTHOGONAL SIGNAL DEMODULATION

(71) Applicant: Cable Television Laboratories, Inc., Louisville, CO (US)

(72) Inventors: Thomas H. Williams, Longmont, CO (US); Luis Alberto Campos, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 148 days.

(21) Appl. No.: 13/841,313

(22) Filed: Mar. 15, 2013

(65) Prior Publication Data
US 2014/0003547 A1 Jan. 2, 2014

Related U.S. Application Data

(63) Continuation-in-part of application No. 13/538,456, filed on Jun. 29, 2012, now Pat. No. 8,787,144.

(51) Int. Cl.
H04L 27/26 (2006.01)

(52) U.S. Cl.
CPC ........ H04L 27/265 (2013.01); H04L 27/2647 (2013.01)

(58) Field of Classification Search
USPC ....................................................... 370/208
See application file for complete search history.

(56) References Cited

U.S. PATENT DOCUMENTS

| 5,493,716 A | * | 2/1996 | Bane | ................ H04W 52/0229 |
| | | | | 455/229 |
| 5,999,561 A | * | 12/1999 | Naden | .................... H04B 1/707 |
| | | | | 375/142 |
| 6,084,932 A | * | 7/2000 | Veintimilla | ................... 375/355 |

(Continued)

OTHER PUBLICATIONS

Barros, Daniel J. F.; Wilson, Sarah K.; Kahn, Joseph M; Comparison of Orthogonal Frequency-Division Multiplexing and Pulse-Amplitude Modulation in Indoor Optical Wireless Links; IEEE Transactions on Communications, vol. 60, No. 1, Jan. 2012.*

Primary Examiner — Melvin Marcelo
Assistant Examiner — Peter G Solinsky
(74) Attorney, Agent, or Firm — Armstrong Teasdale LLP

(57) ABSTRACT

A modulation transmission technique comprises placing orthogonal subcarriers across an arbitrary-wide band of frequencies without a fixed pre-defined center frequency. Receivers demodulate only the sub-group of subcarriers in which they are to receive data. Thus a broadcast service with many audio programs could send signals across a wide band and receivers would only demodulate the audio channel that the user or users wanted to hear. This saves energy which is important for battery powered devices. A transform bandwidth smaller than the transform bandwidth of the transmitter is used that encompasses the receivers pass band, plus the 2 transition bands (upper and lower) of the linear filter. This technique maintains orthogonality between subcarriers. The subcarriers in the pass band are utilized and the subcarriers in the transition bands are discarded. The orthogonal subcarriers may include both orthogonal frequency division multiplexed and pulse amplitude modulated signals. A notch filter may be included in the receiver to remove unwanted non-orthogonal signals such as a television signal or other interference.

8 Claims, 4 Drawing Sheets

(56) References Cited

U.S. PATENT DOCUMENTS

| | | | |
|---|---|---|---|
| 6,577,855 B1* | 6/2003 | Moore et al. | 455/324 |
| 6,671,334 B1* | 12/2003 | Kuntz et al. | 375/340 |
| 6,677,862 B1* | 1/2004 | Houlihane et al. | 340/870.03 |
| 7,346,279 B1* | 3/2008 | Li | H04B 10/40 398/155 |
| 2005/0018784 A1* | 1/2005 | Kurobe et al. | 375/260 |
| 2005/0152460 A1* | 7/2005 | Yoshimi et al. | 375/257 |
| 2005/0233710 A1* | 10/2005 | Lakkis | H04B 1/71632 455/102 |
| 2006/0038925 A1* | 2/2006 | Krug | H03D 7/1433 348/726 |
| 2006/0062317 A1* | 3/2006 | Chang | H04L 27/2607 375/260 |
| 2006/0120267 A1* | 6/2006 | De Bart | H04L 25/0236 370/208 |
| 2006/0165117 A1* | 7/2006 | Iwamura | 370/464 |
| 2007/0032217 A1* | 2/2007 | Su | 455/337 |
| 2007/0076714 A1* | 4/2007 | Ananthakrishnan et al. | 370/390 |
| 2007/0155413 A1* | 7/2007 | Kerstenbeck | 455/502 |
| 2007/0173202 A1* | 7/2007 | Binder | H04B 7/15542 455/68 |
| 2008/0043861 A1* | 2/2008 | Moffatt | H04L 27/2618 375/260 |
| 2008/0112359 A1* | 5/2008 | Cleveland et al. | 370/329 |
| 2008/0152027 A1* | 6/2008 | Kalluri et al. | 375/260 |
| 2008/0219235 A1* | 9/2008 | Ma | H04B 7/2621 370/344 |
| 2008/0253470 A1* | 10/2008 | Lee | H04L 27/2649 375/260 |
| 2009/0051926 A1* | 2/2009 | Chen | 356/511 |
| 2009/0147874 A1* | 6/2009 | Huh | 375/260 |
| 2010/0080312 A1* | 4/2010 | Moffatt | H04B 1/713 375/260 |
| 2010/0104001 A1* | 4/2010 | Lee et al. | 375/240 |
| 2010/0197257 A1* | 8/2010 | Rajkotia et al. | 455/188.1 |
| 2010/0246472 A1* | 9/2010 | Wu et al. | 370/315 |
| 2010/0296596 A1* | 11/2010 | Miyamoto | 375/260 |
| 2010/0309834 A1* | 12/2010 | Fischer et al. | 370/312 |
| 2010/0317284 A1* | 12/2010 | Charbit et al. | 455/7 |
| 2011/0007830 A1* | 1/2011 | Tanaka | 375/260 |
| 2011/0051790 A1* | 3/2011 | Honda | H04B 1/0475 375/224 |
| 2011/0078532 A1* | 3/2011 | Vonog et al. | 714/752 |
| 2011/0188610 A1* | 8/2011 | Otsuka | H04L 27/06 375/317 |
| 2011/0199983 A1* | 8/2011 | Hasan Mahmoud et al. | 370/329 |
| 2012/0014416 A1* | 1/2012 | Dabiri | H03H 21/0012 375/144 |
| 2012/0147928 A1* | 6/2012 | Nakano et al. | 375/130 |
| 2012/0263251 A1* | 10/2012 | Djordjevic | H04L 1/0042 375/261 |
| 2012/0263393 A1* | 10/2012 | Yahil | 382/264 |
| 2012/0314696 A1* | 12/2012 | Liu | 370/338 |
| 2013/0028118 A1* | 1/2013 | Cherian et al. | 370/252 |
| 2013/0044896 A1* | 2/2013 | Ekstrand | 381/98 |
| 2013/0077551 A1* | 3/2013 | Lo | H04W 16/14 370/312 |
| 2013/0079640 A1* | 3/2013 | Osawa | 600/447 |
| 2013/0108271 A1* | 5/2013 | Tang | H04L 7/0008 398/66 |
| 2013/0129348 A1* | 5/2013 | Mak | H04B 10/07953 398/26 |
| 2013/0229996 A1* | 9/2013 | Wang et al. | 370/329 |
| 2014/0169501 A1* | 6/2014 | Nazarathy | H03H 17/0266 375/316 |
| 2014/0301262 A1* | 10/2014 | Homchaudhuri | H04W 52/0235 370/311 |
| 2014/0348252 A1* | 11/2014 | Siohan et al. | 375/261 |

* cited by examiner

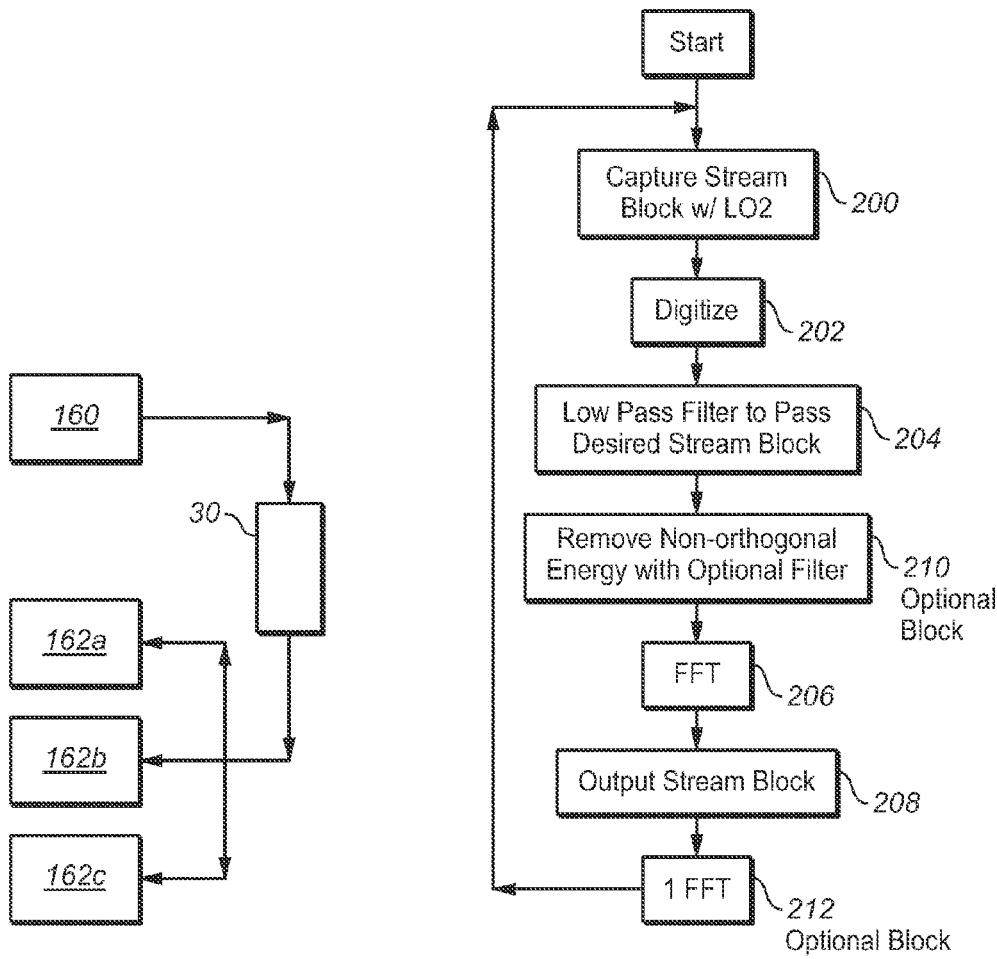
FIG. 3B
FIG. 5
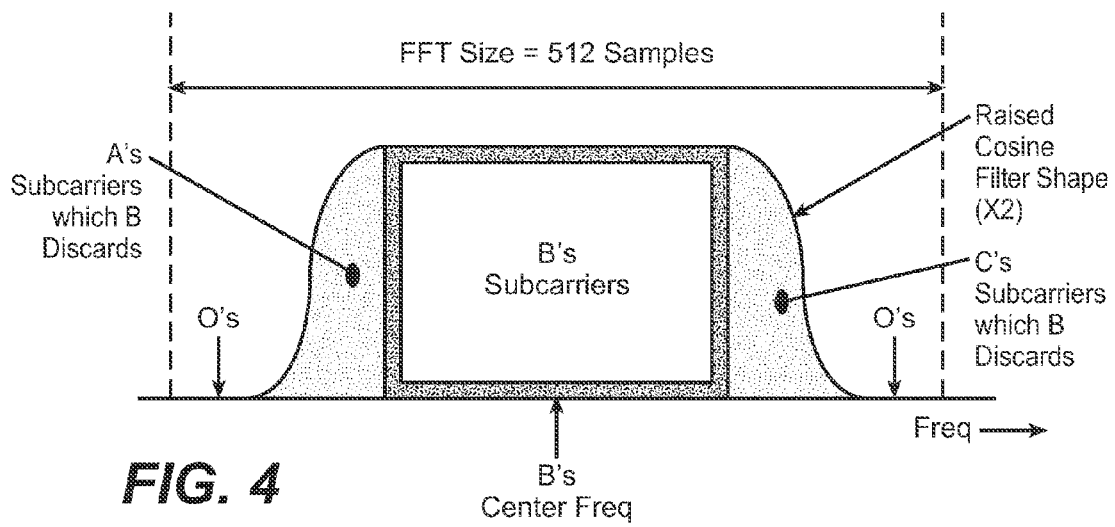
FIG. 4

ORTHOGONAL SIGNAL DEMODULATION

CROSS REFERENCE TO RELATED APPLICATION

This application is a continuation in part application of Ser. No. 13/538,456 entitled "Interleaved Signaling", filed Jun. 29, 2012, which application is incorporated herein in its entirety by reference.

BACKGROUND OF THE INVENTION

OFDM (orthogonal frequency division multiplexing) is well known in the art and utilizes a principle of a duality between the time and frequency domains. A data transmission is conventionally made by creating frequency domain symbols around baseband (centered at zero Hz), followed by an IFFT (inverse fast Fourier transform) to convert the frequency domain symbols (or subcarriers) into the time domain. Next, a guard interval (also known as a cyclic prefix) is placed on the time domain block, and the block is up-converted and transmitted. The up-conversion is conventionally from baseband to an RF band with a center frequency and a bandwidth that are pre-known to both the transmitter and the receiver. At the receiver, the block of data is down-converted back to baseband, followed by a removal of the guard interval, followed by a FFT (fast Fourier transform), followed by equalization to produce the original frequency domain symbols. Pilot subcarriers are inserted to assist equalization. FEC (forward error correction) is normally used against channel errors.

Conventionally, OFDM signals are demodulated by mixing the center frequency to DC (zero Hz) using a complex demodulator, and low-pass filtering all of the sidebands to include all of the component subcarriers, but to exclude the energy that is out-of-band. Mixing and filtering can be either analog or digital, with digital generally being preferred in modern communication systems.

OFDM signals are comprised of frequency-domain subcarriers (or frequency domain symbols), where the number of subcarriers is usually two raised to some integer number, such as 1024, or 4096. In the time domain, component subcarriers are sine and cosine basis functions employing a cyclic prefix (or guard interval) which provides immunity to echoes with an associated time delay. By having an integer number of cycles, the subcarriers of a composite signal maintain orthogonality to each other.

This current technology presents a constraint in modern receiver design, such as cell-phones or terminal units (such as cable modems) where the bandwidth is extremely wide, but at times the receiver needs only a small amount of data, while the receiver must be low cost and/or have low power consumption. This commonly happens in sleep-mode, while receiving a low bandwidth phone call, or in standby. At other times, the receiver needs to receive large quantities of data occupying a large bandwidth, and using more electrical power is acceptable.

If every receiver must demodulate everything to find a small quantity of data for itself, the signal processing wastes energy and shortens battery life.

It is therefore desirable to provide an improved receiver where the above identified problems are alleviated.

SUMMARY OF THE INVENTION

In one embodiment, a receiver derives one of a plurality of stream-blocks of orthogonal subcarriers from time domain samples received from at least one transmitter. The one stream block derived is assigned to a particular data pipe or one or more users. The at least one transmitter performs an inverse Fast Fourier Transform of the plurality of stream-blocks of orthogonal subcarriers to time domain samples using a transform size that is large enough to contain all of the subcarriers in the plurality of stream-blocks and performs an up conversion of such time domain samples to a radio frequency center frequency. The receiver comprises a converter including an oscillator for down converting the up converted time domain samples. The oscillator provides a frequency that preferably is different from the radio frequency center frequency of the up conversion in the transmitter. The receiver comprises a low pass filter that filters the down converted time domain samples. The low pass filter passes the one stream-block of subcarriers assigned to the particular data pipe, user or users and attenuates subcarriers that are not the subcarriers in such stream-block. The receiver comprises also a Fast Fourier Transform device that transforms said time samples that passed the low pass filter from time domain to frequency domain using a transform size that is smaller than the transform size of the inverse Fast Fourier Transform at the transmitter.

Another embodiment is directed to a method for deriving one of a plurality of stream-blocks of orthogonal subcarriers from time domain samples received from the at least one transmitter of the type described immediately above. The method comprises down converting the up converted time domain samples and low pass filtering the down converted time domain samples. The filtering passes the one stream-block of subcarriers assigned to the particular data pipe, user or users and attenuates subcarriers that are not the subcarriers in such stream-block. The subcarriers that passed the low pass filter are Fast Fourier transformed from time domain to frequency domain using a transform size that is smaller than the transform size of the inverse Fast Fourier Transform at the at least one transmitter.

In another embodiment, a receiver derives one or more stream-blocks of orthogonal subcarriers from time domain samples and a signal or interference at a frequency not orthogonal to said stream-blocks of orthogonal subcarriers received from a transmitter. The transmitter performs inverse Fast Fourier Transform of the plurality of stream-blocks of subcarriers using a transform size that is large enough to contain all of the subcarriers in the plurality of user-blocks and performs up conversion of such time domain samples and the non-orthogonal signal. The receiver comprises a converter including an oscillator for down converting said up converted time domain samples and said non-orthogonal signal; a low pass filter that filters the down converted time domain samples and said non-orthogonal signal and a second filter that has a stop band containing the frequency of the non-orthogonal signal or interference that is not orthogonal to said user-blocks of orthogonal subcarriers. The receiver comprises also a Fast Fourier Transform device that transforms said stream-blocks that passed the low pass filter and the second filter from time domain to frequency domain.

Yet one more embodiment is directed to a method for deriving one or more stream-blocks of orthogonal subcarriers from time domain samples received from the transmitter of the type described immediately above. The method comprises down converting the up converted time domain sampled and said non-orthogonal signal; low pass filtering the down converted time domain samples and said non-orthogonal signal and removing from the down converted time domain samples the signal or interference that is not orthogonal to said stream-blocks of orthogonal subcarriers. The filtered down converted time domain symbols are Fast Fourier transformed to derive said one or more stream-blocks.

In yet another embodiment, a receiver derives one or more stream-blocks of subcarriers from time domain samples received from at least one transmitter. The at least one transmitter performs inverse Fast Fourier Transform of the plurality of stream-blocks of subcarriers to time domain samples using a transform size that is large enough to contain all of the subcarriers in the plurality of stream-blocks and performs up conversion of such time domain samples to a radio frequency center frequency. The stream-blocks of subcarriers include pulse amplitude modulated signals and orthogonal frequency division multiplexed signals. The receiver comprises a converter including an oscillator for down converting said up converted time domain samples; a low pass filter that filters the down converted time domain samples. The receiver comprises also a Fast Fourier Transform device that separates and transforms said pulse amplitude modulated signals and orthogonal frequency division multiplexed (OFDM) signals that passed the low pass filter from time domain to frequency domain; and an inverse Fast Fourier Transform device that transforms the pulse amplitude modulated signals from frequency domain to time domain.

Still another embodiment is directed to a method for deriving one or more stream-blocks of subcarriers from time domain samples received from the transmitter of the type described immediately above. The method comprises down converting the up converted time domain samples; low pass filtering the down converted time domain samples and Fast Fourier transforming and separating said filtered pulse amplitude modulated signals and the filtered orthogonal frequency division multiplexed signals. The pulse amplitude modulated signals are inverse Fast Fourier transformed from frequency domain to time domain.

One more embodiment is directed to a group of receivers, each receiver for deriving one of a plurality of stream-blocks of orthogonal subcarriers from time domain samples from at least one transmitter. The one stream block is assigned to a particular data pipe or one or more users. The at least one transmitter performs inverse Fast Fourier Transform of the plurality of stream-blocks of orthogonal subcarriers to time domain samples using a transform size that is large enough to contain all of the subcarriers in the plurality of stream-blocks and performs up conversion of such time domain samples to a radio frequency center frequency. Each of said receivers in the group comprises a converter including an oscillator for down converting said up converted time domain samples; a low pass filter that filters the down converted time domain samples. The low pass filter passes the one stream-block of subcarriers assigned to the particular data pipe, user or users and attenuating subcarriers that are not the subcarriers in such stream-block. A Fast Fourier Transform device of such receiver transforms the subcarriers that passed the low pass filter from time domain to frequency domain using a transform size that is smaller than the transform size of the inverse Fast Fourier Transform at the at least one transmitter. At least some of the plurality of stream-blocks of orthogonal subcarriers are simultaneously derived by the group of receivers.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 3B is a block diagram for a transmitter and receiver system with multiple receivers to illustrate an embodiment of the invention with continuous bandwidth transmission.

FIG. 4 is a spectral plot showing an individual receiver selecting a subset of subcarriers from the continuous OFDM transmission FIG. 5 is a diagram of the processing steps carried out by the receiver in the embodiment of FIG. 3A.

Identical components are labeled by the same numerals in this document.

DETAILED DESCRIPTION OF EXEMPLARY EMBODIMENTS

Figure 1:
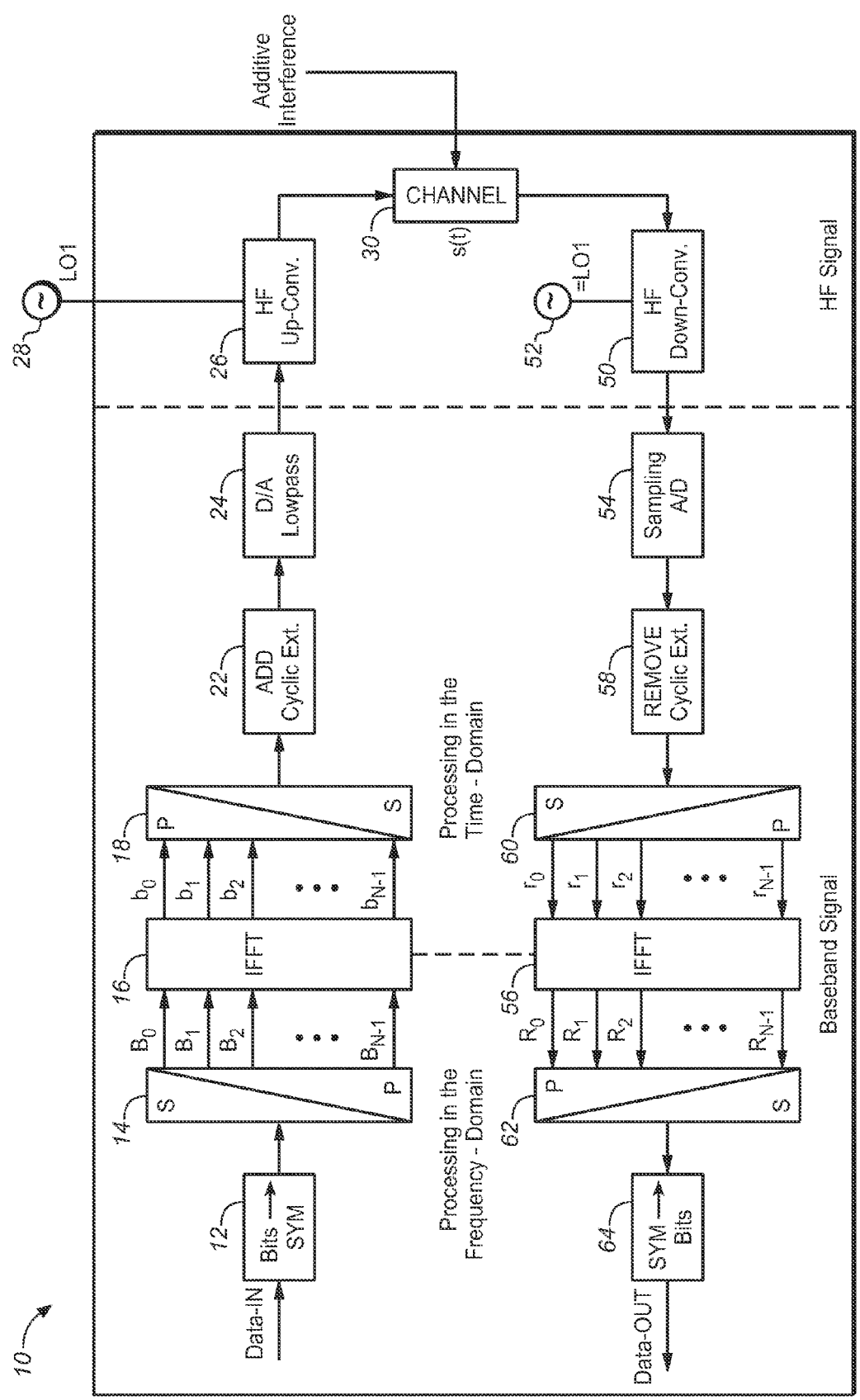
FIG. 1 is a block diagram of a prior art OFDM system.

FIG. 1 is a block diagram of a conventional OFDM transmission system 10. If a common signal is broadcast to multiple users of data, each user's data inside a composite signal may be unique. In a first step serial data to be transmitted is inputted into a receiver and the bits are transformed into frequency domain (FD) symbols by block 12. In a second step the FD symbols are collected into a serial-to-parallel converter 14. When the converter is full, an IFFT by block 16 (which may be implemented in ASIC) is performed, converting the FD symbols into time domain (TD) samples for transmission. A parallel to series converter 18 after the IFFT converts the TD samples into a serial stream for transmission. Before transmission a guard interval (or cyclic prefix) is added by block 22 to provide for immunity against linear distortion. The guard interval ideally should be at least as long as the longest anticipated echo. Next the samples are converted into analog form by a D-A converter 24, and low pass filtered in converter 24 to limit the bandwidth, as required by Nyquist's sampling theorem. After up-conversion by block 26 to a radio frequency center frequency L01 using a first local oscillator 28, the signal s(t) is transmitted in block form over a channel 30, which can be a wired channel (such as a coaxial cable) or a wireless channel.

The receiver blocks reverse the operation of the transmitter, using the same center radio frequency L01 for down conversion block 50 in demodulation that was used by the transmitter for modulation. Thus, a second local oscillator 52 used for down conversion by the receiver should be running at a same frequency L01 as the first local oscillator 28 at the transmitter. The size of the transmitter's Fourier transform, e.g. 8192 is also used by the receiver's Fourier transform block 56, also 8192. Likewise, the transmitter's sampling clock frequency used by the A-D converter 54 will normally be the same frequency as the one used by the transmitter's D-A converter 24. The guard interval (or cyclic prefix) added in the transmitter is removed by block 58. The serial data stream is then converted to parallel by block 60 prior to the FFT block 56 and converted back to serial by block 62 after the TD to FD conversion by FFT block 56. Block 64 then converts the FD symbols into bits.

The IFFT and its inverse, the FFT, operate on complex numbers with a real and an imaginary part. Thus, there is a real and imaginary component to each symbol in the frequency domain and the time domain data paths in FIG. 1. The size of the IFFT is generally two raised to an integer power, such as 8192. If desired, zeros can be added in the frequency domain to create spectral holes as desired. The spectral holes can be surrounded by the FD symbols, or off to a channel edge(s). The FFT and IFFT are well known in the art. The code to implement a FFT or IFFT can be found in the book "C Language Algorithms for Digital Signal Processing" by Paul Embree and Bruce Kimble, Prentice-Hall, Inc. Upper Saddle River, N.J., USA ©1991. Most of the functional blocks above may be implemented in ASIC or FPGA.

As noted above, if every receiver will need to demodulate everything to find a small quantity of data it requires, it wastes energy and shortens battery life.

Solution to the problems encountered in the conventional system in FIG. 1:

The entire available bandwidth may be used for one broadband OFDM transmission comprised of groups of orthogonal subcarriers, where each of at least one of the groups is assigned to a particular user such as in unicast or to a particular data pipe such as a channel in broadcast mode to which users can tune their receivers to. Individual receivers will receive only the group of orthogonal subcarriers that contain their respective data. Receivers may be informed which subcarriers to tune for dynamic data services by a control channel (specifying center frequency and subcarriers assigned to the media access control address or MAC address of the user for example) for unicast, or by prior assignment for static data services, such as broadcast. A Cable Modem Termination System (CMTS) or a cellular phone base station may assign center frequency and subcarriers to MAC address of the user for example.

Figure 2:
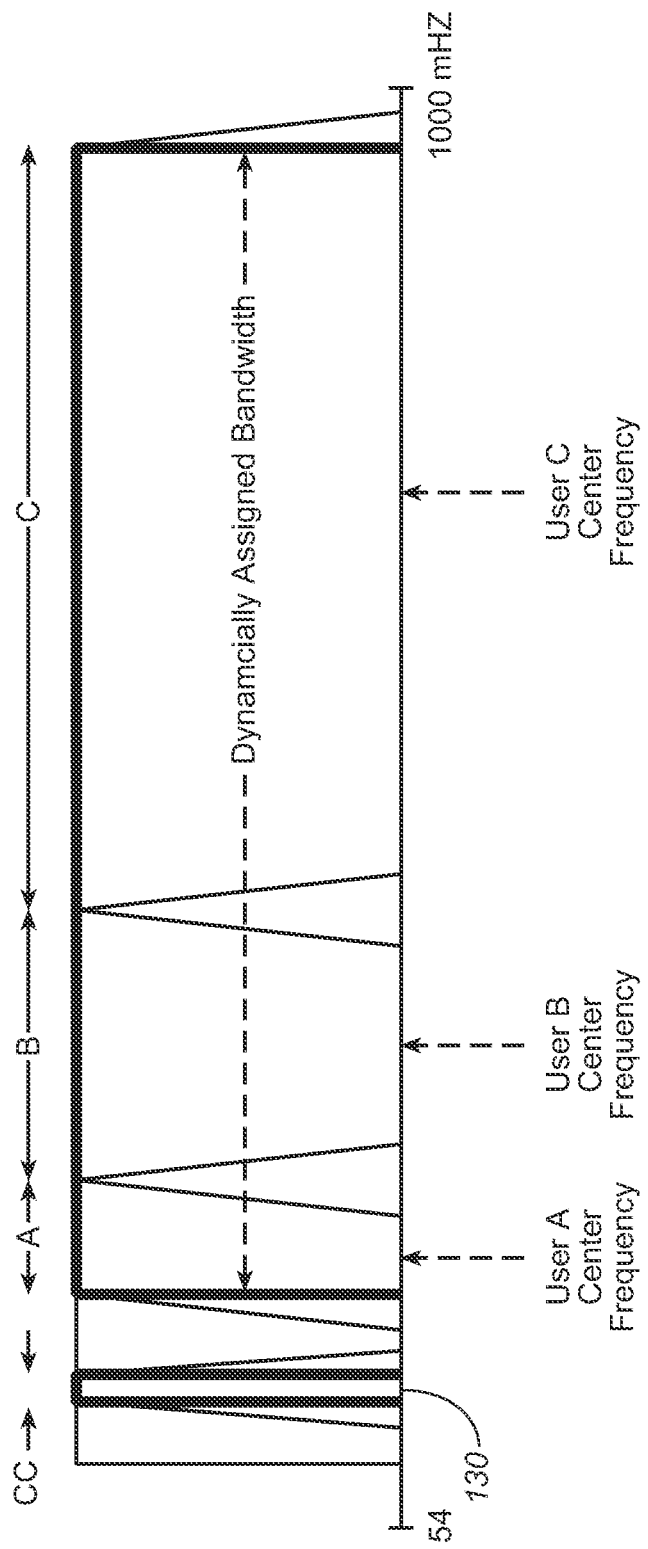
FIG. 2 is a continuous bandwidth OFDM block in the frequency domain.

Each receiver will be assigned a different center frequency to mix down to a center frequency of DC. See FIG. 2. The broadband OFDM transmission comprises of a plurality of stream-blocks of adjacent subcarriers, including for example the three stream-blocks of adjacent subcarriers for users A, B and C as illustrated in FIG. 2. The plurality of stream-blocks of adjacent subcarriers for User A, user B and user C all are using different center frequencies for demodulation. Furthermore, each user has been assigned a different set of subcarriers at different RF frequencies. User A has a small number of subcarriers, user B has more, and user C has the remainder of a downstream cable band. As shown in the embodiment of FIG. 2, each of the three stream blocks for users A, B and C includes adjacent subcarriers.

Figure 3A:
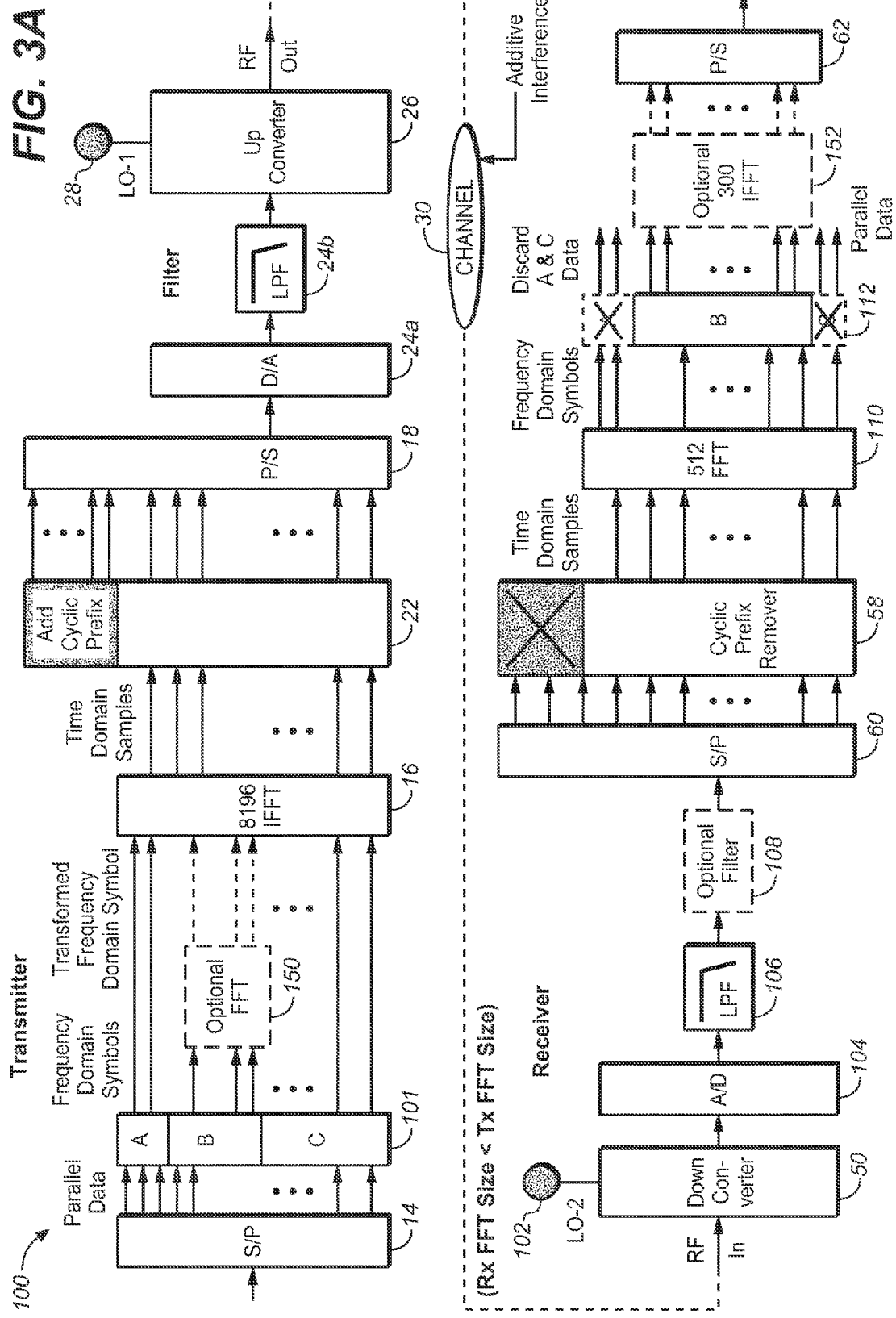
FIG. 3A is a block diagram for a transmitter and receiver system to illustrate an embodiment of the invention with continuous bandwidth transmission.

FIG. 3A is a block diagram for a transmitter and receiver system 100 to illustrate an embodiment of the invention with continuous transmission. FIG. 4 shows the time trace of the demodulated signal in the receiver.

The embodiment of FIGS. 3A and 4 operate generally as follows. After demodulation (around DC) low pass filtering in the receiver is applied to the group of assigned subcarriers with sufficient bandwidth to allow all of the assigned subcarriers in the selected stream-block to pass without attenuation, but to attenuate un-assigned (undesired) subcarriers from other adjacent stream-blocks. Note that filters cannot be made "brick wall" without design problems, so the baseband low pass filters may have a gradual roll-off. The filtered data stream is captured in a buffer and transformed back into a frequency domain with an FFT (Fast Fourier Transform) using a transform size that is smaller than that (e.g. 8192) used in the IFFT of the transmitter and that is large enough to contain all of the subcarriers that contain energy, both desired and undesired subcarriers. Because of the low pass filters, the desired subcarriers will have full amplitude, but undesired subcarriers will also be present, but at attenuated levels.

In this example 512 samples are captured in the time domain by the receiver and transformed into 512 samples in the frequency domain. In FIG. 4 the results of the FFT are displayed. Observe that only 512 samples in the center of the transform are for this receiver, and the remainder of the samples (many of which are partially or fully attenuated) are for another receiver.

At this point you just discard the undesired subcarriers by ignoring (or zeroing-out) these subcarriers and using the assigned subcarriers. Thus if a 512 point FFT is used, only the frequency domain symbols assigned to this particular receiver, such as subset of 300 subcarriers can be retained, and the rest ignored.

This process works because the Fourier transform is a linear process and attenuated subcarriers will remain orthogonal.

Note that in the transition region, the unwanted subcarriers still will be orthogonal to the desired subcarriers. This precludes other non-orthogonal energy sources, such as analog TV carriers or ITU-J83B digital TV carriers. These types of non-orthogonal carriers will need to be at frequencies where the low pass filters will have zero response. Vacant spectrum, since it contains no energy, presents no problems for the orthogonality of the subcarriers in the transform.

Note that the synchronization will require assistance for quick channel acquisition. This can be handled by using subcarriers with zero value or pilot tones with pre-assigned patterns. The pilot tones can use values that are static or deterministic in frequency, phase and magnitude.

FIG. 3A is a block diagram of an embodiment of the present invention, which will be explained in more detail below. The operation of the transmitter in system 100 is similar to the operation of the transmitter in FIG. 1, except that frequency domain symbols with data for individual users A, B and C as well as for many other users (only data inputs for users A, B, C to transmitter shown, and those for other users not shown in FIG. 3A) are grouped together by frequency, forming multiple stream-blocks of adjacent subcarriers, where the data inputs for users A, B, C are as shown in FIG. 2. Thus, frequency domain symbols with data for individual users A, B and C (those of other users not shown) are first converted from serial to parallel by converter 14, where the parallel data are grouped by block 101 together by frequency into stream blocks A, B and C. The D/A low pass filter 24 is split into D/A converter 24a and low pass filter 24b in FIG. 3A.

At the receiver, a different local oscillator 102 at frequency L02 (where L02 is preferably different from L01) may preferably be used by each individual receiver's down converter 50 to select the desired stream-block from the entire transmitted block, although it is possible for one of the receivers to still use an oscillator at the frequency L01 used in the transmitter. Frequency L02 used in the receiver is unique and different for each of the users, such as the three different center frequencies for users A, B, C shown in FIG. 2. A low pass filter 106 with a pass band that matches the frequency range of the subcarriers assigned to any particular user or data pipe passes the desired stream-block and provides partial to full attenuation of other user's blocks. The A-D converter 104 samples at a lower rate than the D-A converter 24 in the transmitter of FIG. 2, above the Nyquist sampling rate associated with the low pass filter 106. Downconverter 50 includes lowpass filtering to prevent aliasing on A-D converter 104. An optional filter 108, to be discussed later, allows undesired energy to be rejected in the pass band of the user's subcarriers. FIG. 4 shows the spectral plot of the demodulated signal for user B, where the subcarriers for users A and C are attenuated. As noted above, low pass filer 104 has a roll off at frequencies of the subcarriers for users A and C, so that even though it passes some of the energy of these subcarriers, these subcarriers are attenuated. Low pass filter 104 is linear and may be of any design to meet system requirements.

FFT device 110 converts the TD samples for users A, B and C to FD symbols, but with a transform size smaller than that used in the IFFT block 16. In the example of the users A, B and C above, the transform size is 512 samples. Thus, the receiver in system 100 has to process a vastly reduced quantity of data, which renders the receiver much more efficient and the receiver consumes much less power than the receiver in FIG. 1. The decoder 112 then decodes only the FD symbols for user B and discards those for users A and C. The above embodiment thus enables arbitrary bandwidth used in low pass filter 106 and arbitrary bandwidth (related to transform size) to be used in the FFT 110, and arbitrary local oscillator frequency L02 to be used in oscillator 102. Information about the center frequency, subcarriers assigned to the user or data pipe and transform size may be either pre-designated as for broadcast channels, or carried in a control channel 130 that is embedded in the signals transmitted to the receiver. Thus, the control channel may be considered to be a separate stream-block, included with other stream blocks (such as a channel guide), or received by an out-of-band receiver.

FIG. 3B is a block diagram for a transmitter and receiver system with multiple receivers to illustrate an embodiment of the invention with continuous bandwidth transmission. As shown in FIG. 3B, three receivers 162a, 162b and 162c for users A, B and C respectively receive transmitted signals through channel 30 from the transmitter 160 which contains blocks such as the transmitter blocks shown in FIG. 3A and described above. Each of the receivers 162a, 162b and 162c contains the blocks 50, 60, 102, 104, 106, 108, 110, 112 shown in FIG. 3A and described above. However, the frequency L02 of the oscillators 102 may be unique to, and different from one another in, the receivers 162a, 162b and 162c, such as in the unicast mode. The bandwidth or transform size of the FFT 110 in the receivers 162a, 162b and 162c may also be different, such as in the unicast mode. Control channel 130 may be used to inform each of the receivers 162a, 162b and 162c its corresponding frequency L02 and bandwidth to be used therein. However, in the broadcast mode, a common center frequency and bandwidth may be pre-designated for the receivers. In this manner, each of the three receivers 162a, 162b and 162c may derive the signals intended for it simultaneously in either mode. Obviously, fewer or more than three receivers 162a, 162b and 162c may be employed in FIG. 3B; all such variations are within the scope of the invention.

It is possible to optionally include orthogonal PAM (pulse amplitude modulated) signals in the transmitter's stream blocks of FIG. 3A, where the PAM time-domain signals are first transformed into the frequency domain using a FFT device 150 as illustrated in the transmitter of FIG. 3A. The PAM signals will be in addition to the OFDM signals, so that both types are transmitted and received in the manner as described in FIG. 1, where arbitrary center frequency and arbitrary bandwidth (transform size) are not used. This technique is disclosed in patent application filed Jun. 29, 2012 Ser. No. 13/538,456 entitled "Interleaved Signaling," and is incorporated herein by reference.

This feature could be useful depending on channel conditions. For example, if one receiver has a line-of-sight signal path to the transmit antenna, it could optimally use PAM. If another receiver had an indirect path to the transmitting antenna involving shadowing and multiple reflections, OFDM modulation would be expected to perform better. This technique can be used with or independently of the features described above in reference to FIG. 3A. At the receiver the PAM signals must be converted back into the time domain with a IFFT block 152 as illustrated in the receiver of FIG. 3A. Thus some of the stream blocks use PAM modulation and others may use OFDM modulation. This technique may be used in each of the receivers 162a, 162b and 162c of FIG. 3B.

While system 100 is intended to operate on orthogonal signals, in some situations, non-orthogonal energy may be processed by the system as well, such as where the non-orthogonal energy is intentionally inserted at the head end or base station. Where the non-orthogonal energy could be anticipated, the transmitter's IFFT would create a spectral hole (with zeroes for the corresponding subcarriers). Or the non-orthogonal energy could be unexpected (such as intermittent ingress) where an affected stream-block could be unrecoverable, but other stream-blocks would be unaffected. This technique can be used with or independently of the features described above in reference to FIG. 3A, such as in the system 10 of FIG. 1. This technique may be used in each of the receivers 162a, 162b and 162c of FIG. 3B.

Details for the Embodiment of FIG. 3A:

To avoid OFDM signal splatter on the band edges, designers may use a time domain filter, such as a raised-cosine filter, (Tukey) to limit out-of-band energy. This causes excess bandwidth, such as 1 to 4%, to be used at the band edges The embodiment works for combined transmissions from multiple sources (OFDMA or orthogonal frequency division multiple access) or reception from a single source (OFDM or orthogonal frequency division multiplexing). The received signal thus can be from a single transmitter, or multiple OFDMA transmissions that combine to create a composite signal from orthogonal subcarriers.

Every subcarrier needs a common cyclic-prefix, or guard interval length.

Different users can have different modulation orders or different code strengths depending on the channel characteristics of their respective signal paths.

Sampling in time domain occurs above the Nyquist limit, which is greater than twice the reciprocal of the bandwidth of the signal.

A pre-assigned control channel 130 of any bandwidth can be assigned at any frequency.

Different users can re-use the same subcarriers at different times.

Control channel 130 may be an included stream-block as shown in FIG. 2 or it may be provided by other means, such as an out-of-band channel. The bandwidth and center frequencies assignment for stream-blocks can be dynamic, static, or quasi-static.

FIG. 5 is a diagram of the processing steps carried out by the receiver in the embodiment of FIG. 3A. The stream block is captured and down converted in frequency in the receiver using a center frequency that may be defined by a control channel. The center frequency is preferably different from the center frequency used in the up conversion in the transmitter (block 200). The passed subcarriers are then digitized (block 202). The down converted stream block is then low pass filtered (block 204) to pass the subcarriers in the stream block for a particular user or data pipe and attenuate other subcarriers. The filtered samples are Fast Fourier Transformed (206) with a transform size that may be set according to a control channel and that is different from that used by the transmitter and outputted, where the subcarriers in the stream block other than those for the particular user or data pipe are discarded (208). Optionally, any non-orthogonal energy received by the receiver may be filtered out (block 210). Where the signals transmitted and received include PAM and OFDM signals, the PAM signals undergo IFFT in block 212 to transform the signals from FD to TD. Where the signals transmitted and received do not include PAM signals, this step may be omitted. The receiver then returns to block 200 to capture another stream block.

The stream-blocks may be demodulated by several receivers in a same service group, each capable of demodulation of the modulation-order (constellation size) employed by the stream block.

It should be noted that the IFFT size at the transmitter is larger than the FFT size at the receiver in this description. However the maximum size of the IFFT at the transmitter may be virtually unlimited, and constrained only by the available bandwidth for transmission.

In another embodiment, the stream-block may contain data for multiple users. The user's data may be organized by subcarriers, or packet identifiers. For example, the subcarriers in the frequency band for B in FIG. 2 may contain subcarriers for multiple users within group B carrying data for multiple users, all using such frequency band. Likewise, when the user's data is organized by subcarriers, the subcarriers may be grouped into sub-blocks in the stream-block, or interleaved in the frequency domain within the stream-block. The receiver block for each of the users within group B as shown in FIG. 3A may then be used to demodulate and decode only the data intended for each of the users within group B. The FFT size in such case may be large enough to contain all of the subcarriers (e.g. 512) for all of the users within group B and thus are the same for all users within group B, or the FFT size can be further reduced to process only the data for a particular user within group B. The pass, stop and transition bands of the digital low pass filter in such receivers can be similarly adjusted, depending on whether the subcarriers are grouped into sub-blocks of adjacent subcarriers in the stream-block, or interleaved in the frequency domain within the stream-block.

At the transmitter a spectral hole can be created by inserting zeroes for the value of frequency domain symbols. The holes can be used to either prevent interference in selected frequency bands, or to reduce interference from ingressing signals in said select frequency band.

The present invention may be used in a single frequency network, where signals from multiple transmitters combine in an additive-energy fashion. Likewise the present invention may be used in a MIMO (multiple input-multiple output) antenna network.

Although the various aspects of the present invention have been described with respect to certain preferred embodiments, it is understood that the invention is entitled to protection within the full scope of the appended claims.

What is claimed is:

1. A receiver for demodulation of a transmitted orthogonal frequency multiplexing (OFDM) signal, comprising:
   a down converter including an oscillator for down converting time domain symbols from the transmitted OFDM signal, the OFDM signal including a plurality of stream-blocks of adjacent orthogonal subcarriers, each of the adjacent orthogonal subcarriers having different respective center frequencies;
   an analog to digital converter, separate from the down converter, for sampling the down converted time domain symbols of the OFDM signal from the down converter;
   a low pass filter, separate from the down converter, for filtering the sampled OFDM signal from the analog to digital converter, the low pass filter having a pass band that matches a frequency range of one stream-block of the plurality of stream-blocks;
   a serial to parallel converter for converting a serial data stream from the low pass filter into a parallel data streams of adjacent orthogonal subcarriers within the one stream-block of the plurality of stream blocks;
   a Fast Fourier Transform device for transforming parallel data streams from the serial to parallel converter into frequency domain data, and for discarding frequency domain data included in the one stream-block corresponding to center frequencies different than a selected center frequency; and
   a decoder for decoding frequency domain data from the Fast Fourier Transform device corresponding to the selected center frequency of the adjacent orthogonal sub carriers within the one-stream block.

2. The receiver of claim 1, wherein the low pass filter includes a pass band that is adjustable in response to a control signal.

3. The receiver of claim 1, wherein a transform size of said Fast Fourier Transform device is adjustable in response to a control signal.

4. The receiver of claim 1, wherein a center frequency of the oscillator of the down converter is adjustable in response to a control signal.

5. The receiver of claim 1, wherein the oscillator is capable of providing a frequency that is different from a radio frequency center frequency from an up conversion of the transmitted OFDM signal.

6. The receiver of claim 1, further comprising an inverse fast Fourier transform device for converting frequency domain symbols from the decoder into time domain symbols for transmission.

7. The receiver of claim 6, wherein a number of the time domain symbols converted by the inverse fast Fourier transform is greater than a number of time domain symbols transformed into frequency domain symbols by the Fast Fourier Transform device.

8. A method for demodulating a transmitted orthogonal frequency multiplexing (OFDM) signal, comprising the steps of:
   down converting time domain symbols from the transmitted OFDM signal, the OFDM signal including a plurality of stream-blocks of adjacent orthogonal subcarriers, each of the adjacent orthogonal subcarriers having different respective center frequencies;
   sampling, after the step of down converting, the down converted time domain symbols of the OFDM signal by an analog to digital converter;
   filtering, after the step of sampling, the sampled OFDM signal through a low pass filter having a pass band that matches a frequency range of one stream-block of the plurality of stream-blocks;

converting a serial data stream from the low pass filter into parallel data streams of adjacent orthogonal sub-carriers within the one stream-block of the plurality of stream blocks;
transforming, by a Fast Fourier Transform device, the parallel data streams into frequency domain data;
discarding frequency domain data from the Fast Fourier Transform device corresponding to center frequencies different than a selected center frequency;
decoding frequency domain data corresponding to the selected center frequency of the adjacent orthogonal sub carriers within the one-stream block.

\* \* \* \* \*